Patented Dec. 26, 1939

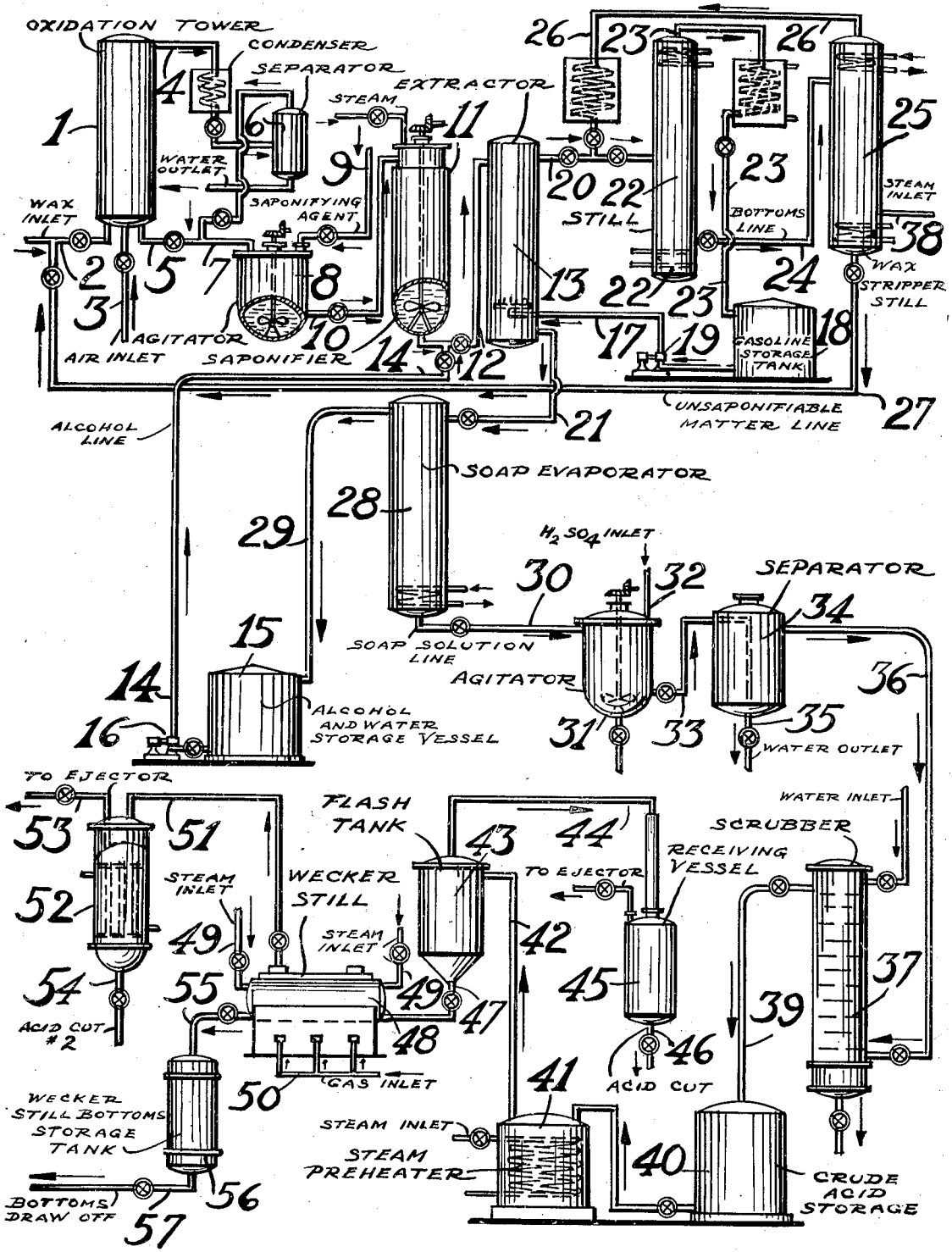

2,184,952

UNITED STATES PATENT OFFICE 2,184,952

RUSTPROOFING COMPOSITION

John C. Zimmer, Hillside, N. J., and Jack B. Crutchfield, Richmond, Va., assignors to Standard Oil Development Company, a corporation of Delaware Application April 30, 1938, Serial No. 205,192

8 Claims. (Cl. 134—1)

This invention deals with the production of superior anti-rusting compositions suitable for the coating of metal and other objects subject to corrosion, rusting, and the like. Such compounds are also suitable as slushing agents for protecting iron and other metal objects from deterioration by weathering during storage.

The chief ingredient employed in these compositions is a residue obtained by the vacuum distillation of acids obtained by the catalytic, liquid phase, low temperature oxidation of wax at atmospheric pressure. In order to obtain a better understanding of the method employed in obtaining this residue, a drawing has been included, showing diagrammatically the various essential steps involved.

Referring to the accompanying drawing, numeral I designates a batch oxidation tower, preferably constructed of aluminum and operated at atmospheric pressure and at about 100–130° C. Wax containing an oxidation catalyst (such as manganese salt or oxide) is introduced into the tower through line 2. Air is then blown through the heated wax until about 40–60% of the wax is converted into saponifiable product, the spent air issuing from line 4 being cooled and the water separated from other liquid products in separator 6. The latter are then withdrawn together with the oxidation product from tower I through lines 5 and 7 and run into agitator 8 wherein caustic or other suitable saponifying agent is introduced through line 9. The resulting mixture is drawn through line 10 into saponifier II which is generally maintained at about 100 lbs. pressure by the introduction of high pressure steam.

After the saponification is completed, the mixture is fed into extractor 13 through line 12, some low molecular weight alcohol (such as isopropyl or methyl alcohol) being added through line 14 in order to prevent any emulsification in the extractor. The purpose of the extraction step is to remove the saponified material from the unsaponified portion. This is accomplished by extracting at about 50–60° C. the saponified mixture (containing the alcohol demulsifier) with a hydrocarbon such as gasoline or naphtha which is pumped from gasoline storage 18 by pump 19 through line 17 into extractor 13 countercurrent to the saponified mixture. The gasoline solution of unsaponified material is then drawn off the top of the tower 13, while the aqueous saponified solution is removed at the bottom of extractor 13 by line 21 and fed into the soap evaporator 28. The purpose of this vessel is to distill off the alcohol and some water through line 29 into the storage vessel 15 for reuse in the extraction operation.

The alcohol-free soap solution is subsequently drawn off evaporator 28 through line 30 into agitator 31 wherein sulfuric acid or other suitable acid is added through pipe 32 for regenerating the acid oxidation products. After the mineral acid has been reacted, the mixture is drawn out through pipe 33 into separator 34. Here a separation occurs. The bottom layer consisting chiefly of water containing soluble salts is drawn off the bottom at 35, while the top layer consisting essentially of the acid products is removed through line 36, washed with water in scrubber 37 and fed into crude acid storage 40 by means of line 39.

Now returning to the extractor 13, the gasoline solution of unsaponifiable matter is fed into gasoline still 22 through line 20 and the gasoline taken overhead through line 23 and stored in gasoline storage 18 for re-use. The bottoms from still 22 are drawn out through pipe 24 and fed into the wax stripper still 25, steam being fed in through line 38. The unsaponifiable matter, being free of light ends, is returned by line 27 into the wax feed line 2 leading to the oxidation tower for recycling, while the lower boiling products (consisting essentially of water and gasoline), carried overhead by line 26, are returned to the gasoline still 22 by line 20.

Again returning to the crude acid in storage tank 40, the product is led into steam preheater 41, thence into flash tank 43 via pipe 42. The low boiling acids are distilled over at about 165° C. into receiving tank 45, both vessels 43 and 45 being kept at a vacuum of about 10 mm. of mercury. These low boiling acids, ranging from about $C_3$ to $C_{10}$ may be drawn off at 46 as the first cut. The bottoms from flash tank 43 are drawn through line 47 into the "Wecker" still 48 which is maintained at about 240–260° C. bottoms temperature at 10 mm. vacuum. Steam is fed into this still through lines 49, and the still is heated by gas firing at 50. The overhead from this still is condensed in vessel 52 equipped with an ejector for maintaining vacuum, and the second acid fraction is drawn off at 54. The bottoms from the Wecker still are drawn off at 55 and stored in tank 56. These bottoms may be drawn off at 57 for use in connection with the present invention, as will be further outlined.

The Wecker still bottoms so obtained exhibit many interesting and useful properties heretofore lacking in prior art products. In the first place, the iodine numbers and molecular weights of these bottoms show that they are decidedly unsaturated. Their iodine values range around 18–20 cgs./gm. or more. They show acid numbers of about 50–55 and saponification numbers of 150–160. Their composition approximates 40% free acids, 55% esters and lactones, and 5% unsaponifiable. The acids separated from these bottoms by cold caustic extraction analyze approximately as follows:

| | |
|---|---|
| Iodine number _____cgs./g__ | 9–12 |
| Neutralization value_____mg. KOH/g__ | 80–90 |
| Saponification value (reflux) mg. KOH/g__ | 180–190 |
| Saponification value (pressure) mg. KOH/g__ | 220–230 |
| Molecular weight (average) _____ | 600–650 |

The unsaponified portion analyzes approximately as follows:

| | |
|---|---|
| Molecular weight_____ | 150–155 |
| Saponification value (pressure) mg. KOH/g__ | 110–120 |
| Iodine value _____cgs./g__ | 8–9 |
| Acetyl value _____mgs. KOH/g__ | 88–90 |
| Naphtha soluble _____per cent__ | 97.5 |

The high unsaturation (considering the high molecular weight) of the product is probably due to the fact that no pressure is employed in the oxidation step, since saturated acids have been claimed to be produced when pressure oxidation is used. This unsaturation is believed to contribute considerably to the superiority of the bottoms in the tests to be outlined later. It might also be emphasized that substantially no aldehydes are present in the product. One test showed the presence of only 0.003% total aldehydes (calculated as formaldehyde). Aldehydes and aldehyde-acids are characteristic of vapor phase oxidized products which have been found to be much less suitable for the purpose of this invention.

One specific embodiment of the invention involves the addition of 5 to 60% or more of these bottoms to petrolatum, heavy lubricating oils, or volatile naphthas. Another embodiment involves the addition to the above mixture of 5 to 20% of oil soluble (mahogany) petroleum sulfonate soaps such as the sodium soaps of sulfuric acids obtained in the treating of lubricating oils with fuming sulfuric acid for the production of white oils. The mahogany soaps so added are capable of absorbing moisture as well as producing an emulsifiable composition. An excellent product, however, is prepared by the use of the bottoms, mahogany sulfonates, and degras.

The following examples serve to illustrate many of the superior features of these compositions:

Example 1

A number of polished steel plates were coated with compositions prepared according to this invention and exposed in the open for four months in a roof weathering test. The following data were obtained:

| Composition | Condition of plate after 4 months exposure |
|---|---|
| A. 30% Wecker still bottoms; 70% 150 M. P. petrolatum | Excellent—no rust. |
| B. Commercial anti-rust compound comprising petrolatum and sodium dichromate | Poor—very rusty. |

Example 2

The following treated samples of polished steel plates were subjected to a roof weathering test in the open, and the number of days expired before rusting was observed was noted:

| Composition | Days before rusting |
|---|---|
| C. 10% degras (neutral) 10% mahogany soap (50% oil) 80% naphtha (Varsol) | 1 |
| D. 10% degras 10% mahogany soap (50% oil) 10% Wecker still bottoms 70% naphtha (Varsol) | 18 |
| E. 15% degras (neutral) 15% Wecker still bottoms 70% naphtha (Varsol) | 25 |
| F. 10% degras (neutral) 90% naphtha (Varsol) | 1 |

It will be observed from the above data that, for outside exposure, composition "E" containing Wecker still bottoms and degras in naphtha was most suitable.

Example 3

The following treated cleaned steel plates were subjected to humidifier and water spray tests. The humidifier test consisted in suspending slushed steel plates (2" x 4" x 1/16") in an atmosphere of 100% humidity at 100° F. in a special cabinet (4' x 2' x 2') and noting the time in hours for rusting of the plates to occur. The atmospheric conditions were maintained with air bubbled at the rate of 120 cu. ft./hr. through water at 180° F. and directed against a baffle plate to obtain uniform distribution in the cabinet and to knock out the entrained water droplets. This test is indicative of service for indoor use.

The water spray test was carried out according to the U. S. Navy spray test for evaluation of rust preventives with the following modifications: The slushing compound was applied by dipping sand blasted steel plates at a temperature consistent with ease of application, and the oven heating was omitted. The intermittent water shower was continued until rusting occurred. This test is indicative of service for outdoor use:

| Composition | Test Humidifier | Test Water spray |
|---|---|---|
| G. 10% degras (neutral) 10% mahogany soap (50% oil) 10% Wecker still bottoms 70% naphtha (Varsol) | 288 | 22 |
| H. 20% degras (neutral) 10% Wecker still bottoms 70% naphtha (Varsol) | 264 | 100+ |
| I. 10% degras (neutral) 5% Wecker still bottoms 85% naphtha (Varsol) | 8 | 46 |
| J. 15% degras (neutral) 15% Wecker still bottoms 70% naphtha (Varsol) | 264 | 100+ |
| K. 7.5% degras (neutral) 7.5% Wecker still bottoms 85% naphtha (Varsol) | 8 | 46 |
| L. 30% degras (neutral) 70% lubricating oil | 72 | 2 |
| M. 15% degras (neutral) 15% Wecker still bottoms 70% lubricating oil | 312 | 2½ |

A careful study of the above data will reveal that the use of Wecker still bottoms greatly improves resistance to rusting both indoors and outdoors. For external use, a 5% concentration of these bottoms (Sample I) appears to be too low, although it still showed good service for outdoor use. Wecker still bottoms compositions containing mahogany sulfonates (Sample G) showed exceptional resistance to indoor weathering. Samples L and M illustrate the superiority of Wecker still bottoms when compared to degras which is used commercially for this purpose. The water spray test results should not be taken too seriously, since these two samples contain non-volatile lubricating oil which is washed off readily by the water. Such compositions would ordinarily be employed for inside use.

*Example 4*

Another series of samples was tested as in Example 2:

| Composition | Hours before rusting |
|---|---|
| N. 30% saturated acids obtained by liquid phase pressure oxidation of wax<br>70% cold test petrolatum | 528 |
| O. 30% non-saponifiable product obtained by liquid phase pressure oxidation of wax<br>70% cold test petrolatum | 75 |
| P. 30% Wecker still bottoms<br>70% cold test petrolatum | 600 |

The above results show that the sample (P) containing the unsaturated Wecker still bottoms obtained by atmospheric pressure oxidation of wax were able to withstand rusting 72 hours longer than the sample containing the same amount of acids obtained by pressure oxidation of wax (N), and 525 hours longer than the sample (O) containing the unsaponifiable product. It was also found that the pressure oxidized product had a poor solubility in petrolatum, while the Wecker still bottoms showed good solubility at ordinary temperatures.

These Wecker still bottoms may be used as such, or separated into saponifiable or unsaponifiable portions, which may likewise be employed separately or in combination with each other. The bottoms may also be neutralized with lime, soda, alumina, and other metal bases prior to compounding. Although as little as 5% and as high as 70% or more may be employed, it is found preferable to use 10–30% of these compounds.

The other compounding agents which may be employed with these materials are naphthas, light oils such as kerosene or gas oil, lubricating oils, their solvent extracts or raffinates, petrolatum, paraffin waxes, bright stocks, cracked residues, such as cracking coil tar, asphalts, etc., as well as voltolized hydrocarbons and fats, fatty oils, resins, dyes, metal soaps, e. g., aluminum stearate, naphthenate, calcium rosinate, zinc degras soap, tin oleate, cobalt linoleate, chromium oleate, manganese naphthenate, and the like. Antioxidants such as naphthols, naphthylamines, phenol sulfides and disulfides, sulfur, sulfurized fats, cresols, aliphatic amines and hydroxy amines and naphthenic amines may be added.

Wecker still bottoms, as disclosed herein, are preferably prepared by the oxidation of purified paraffin waxes, although petrolatum may be employed as a raw material, especially if it is deoiled to contain not over about 5% oil. Foots oil obtained by sweating of crude paraffin wax is also a satisfactory raw material. This oil more closely resembles paraffin wax in structure than the usual lubricating oils.

The compositions disclosed herein are also suitable for use in cutting oils, plant sprays, drawing compositions, roll oils, emulsifiable oils, greases, etc.

The above description and examples are intended to be illustrative only, and any modifications of or variations therefrom which conforms to the spirit of the invention is intended to be included within the scope of the claims:

We claim:

1. A rustproofing composition comprising a hydrocarbon coating vehicle containing at least 5% of an aldehyde-free unsaturated distillation residue of acids produced by the low temperature liquid phase catalytic oxidation of hydrocarbon wax at atmospheric pressure.

2. A rustproofing composition comprising a hydrocarbon vehicle containing 5 to 60% of an unsaturated vacuum distillation residue produced by the low temperature liquid phase catalytic oxidation of hydrocarbon wax at atmospheric pressure and having the following approximate analysis:

| | |
|---|---|
| Iodine number_____cgs./g__ | 18–20 |
| Acid number_____mg. KOH/g__ | 50–55 |
| Saponification value_____mg. KOH/g__ | 150–160 |

3. A rustproofing composition comprising a hydrocarbon vehicle containing 5–60% of an unsaturated vacuum distillation residue produced by the low temperature liquid phase catalytic oxidation of hydrocarbon wax at atmospheric pressure, said residue containing approximately 40% free acids, 55% esters and lactones, and 5% unsaponifiable matter, and yielding, upon saponification with cold caustic potash, products having the following approximate composition:

| | Liberated acids from saponified matter | Unsaponified matter |
|---|---|---|
| Average molecular weight | 627 | 151 |
| Iodine number | 9.9 | 8.2 |
| Neutralization value | 85.5 | |
| Saponification value under pressure | 220 | 116 |
| Acetyl value | | 88.64 |
| Percent C | 75.25 | 72.54 |
| Percent H | 12.05 | 13.18 |

4. A rustproofing composition comprising a petroleum hydrocarbon containing about 5 to 30% of an aldehyde-free unsaturated vacuum-distillation residue of acids produced by the low-temperature liquid phase catalytic oxidation of hydrocarbon wax at atmospheric pressure.

5. A rustproofing composition according to claim 4 which also contains 5 to 30% of degras.

6. A rustproofing composition comprising a petroleum hydrocarbon containing about 5 to 30% of an aldehyde-free unsaturated vacuum-distillation residue of acids produced by the low-temperature liquid phase catalytic oxidation of hydrocarbon wax at atmospheric pressure, about 5 to 30% of degras, and about 5 to 30% of mahogany soap.

7. A composition according to claim 6 in which the petroleum normally liquid hydrocarbon is a light hydrocarbon.

8. A composition according to claim 6 in which the petroleum hydrocarbon is a heavy hydrocarbon.

JOHN C. ZIMMER.
JACK B. CRUTCHFIELD.